(12) United States Patent
Zhang et al.

(10) Patent No.: US 8,693,822 B2
(45) Date of Patent: Apr. 8, 2014

(54) LIMITED ROTATION FIBER OPTIC ROTARY JOINT

(75) Inventors: Boying B. Zhang, Lawrenceville, NJ (US); Hong Zhang, North Brunswick, NJ (US); Louis D. Violante, Monroe Township, NJ (US)

(73) Assignee: Princetel Inc., Hamilton, NJ (US)

( * ) Notice: Subject to any disclaimer, the term of this patent is extended or adjusted under 35 U.S.C. 154(b) by 200 days.

(21) Appl. No.: 13/348,045

(22) Filed: Jan. 11, 2012

(65) Prior Publication Data

US 2013/0177276 A1 Jul. 11, 2013

(51) Int. Cl.
*G02B 6/26* (2006.01)
(52) U.S. Cl.
USPC .......................................................... 385/25
(58) Field of Classification Search
None
See application file for complete search history.

(56) References Cited

U.S. PATENT DOCUMENTS

| 4,373,779 | A | * | 2/1983 | Dorsey | 385/26 |
| 4,379,615 | A | * | 4/1983 | Toda et al. | 385/147 |
| 4,753,501 | A | * | 6/1988 | Battle | 385/22 |
| 4,815,812 | A | * | 3/1989 | Miller | 385/61 |
| 4,848,867 | A | * | 7/1989 | Kajioka et al. | 385/25 |
| 4,898,447 | A | * | 2/1990 | Kuhlmann | 385/25 |
| 5,629,993 | A | * | 5/1997 | Smiley | 385/22 |
| 5,920,667 | A | * | 7/1999 | Tiao et al. | 385/22 |
| 2009/0226131 | A1 | * | 9/2009 | Zhang et al. | 385/26 |

* cited by examiner

*Primary Examiner* — Sung Pak

(57) ABSTRACT

The present invention is a limited rotation Fiber Optic Rotary Joint (FORJ) of one or more optical channels. This will enable one or more optical signals to pass across a rotational interface for a fixed number of rotations. For many applications, such as a winch or certain robotic joints, an unlimited number of rotations in either direction is unnecessary. For these types of applications a limited rotation FORJ is an attractive option because they typically have lower loss, are less complex, and have higher reliability.

8 Claims, 3 Drawing Sheets

LIMITED ROTATION FIBER OPTIC ROTARY JOINT

BACKGROUND OF THE INVENTION

The present invention relates generally to the field of apparatus for fiber optic communication, and more particularly, to limited rotation fiber optic rotary joints to provide transmission of an optical signal through a mechanically rotational interface for a limited number of rotations.

An optic device to transmit optic signal from a rotating member to a stationary member is called fiber optic rotary joint (FORJ). There are many different types of fiber optic rotary joint. They can be a single-channel, multi-channel, hybrid (two different types of signals), etc. Fiber optic rotary joints can be generally categorized as either limited or unlimited rotation. A limited rotation FORJ can be rotated a maximum number of times in each direction. Conversely, the number of rotations of an unlimited rotation FORJ is bounded strictly by the life of the unit. For example a limited rotation FORJ with a maximum of 500 rotations may have a life of 10,00,000 rotations but can only be rotated 500 turns either clockwise or counter-clockwise before it has to rotate in the opposite direction. However, an unlimited rotation FORJ with a life of 10,000,000 rotations can be rotated clockwise, counter-clockwise or any combination of the two for a total of 10,000,000 rotations.

While the unlimited rotation fiber optic rotary joints have the obvious benefit of far more rotations in either direction, this benefit comes at a cost. That cost is unusually a significantly more complex design which results in higher signal loss, lower device reliability. If the number of rotations in a given direction is known, for example a tow-array reel with 100 meters of cable, then a limited rotation FORJ can be design for the number of turns necessary to unspool 100 meters of cable. In this and similar applications where the benefit of an unlimited rotation FORJ would not be realized making the limited rotation FORJ with its higher reliability connection and lower signal loss a better and quit often less expensive option.

DETAIL DESCRIPTION OF THE INVENTION

Figure 1:
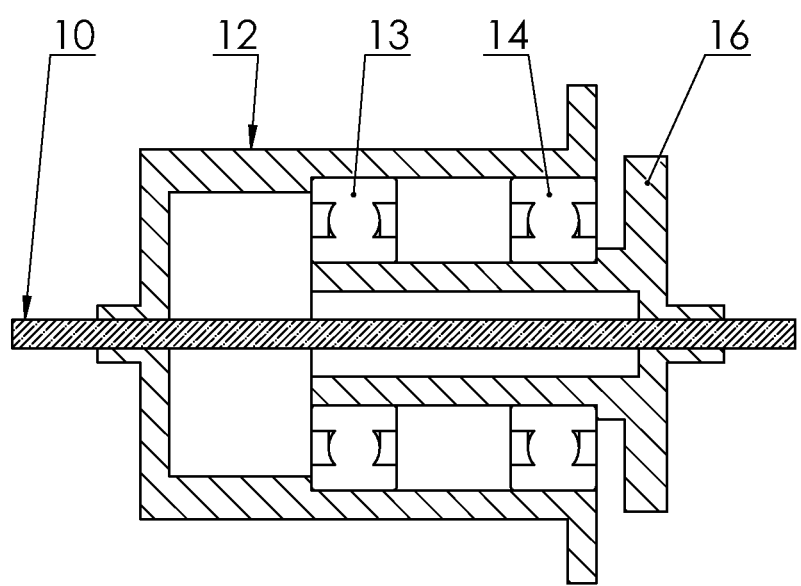
FIG. 1 is a single channel limited rotation FORJ in the present invention.

FIG. 1 shows a possible embodiment of a single channel limited rotation FORJ comprising of an optical fiber (10), a stator (12), a rotor (16) and two bearings (13 and 14). The rotor (16) and stator (12) are relatively rotatable and have a common axis of rotation. Without loss of generality the bearings (13 and 14) are between the rotor (16) and stator (12) providing smooth and concentric rotation of the rotor (16) relative to the stator (12). The optical fiber (10) is mechanically attached to both the rotor (16) and the stator (12). As the rotor (16) and/or stator (12) is rotated relative to the other element the optical fiber (10) twisted. The length of the optical fiber (10) is such that there is enough slack, or extra fiber, between the rotor (16) and the stator (10) so that the forces on the on the optical fiber (10) and it mechanical attachment points associated with the twisting of the optical fiber (10) is sufficiently low to allow the FORJ to rotate for the designed number rotations without a mechanical failure of the optical fiber (10) or the attachment points.

The single channel limited rotation FORJ embodiment of FIG. 1 may be made into a multiple channel limited rotation FORJ simply by adding the plurality of optical fibers (10) or an optical fiber ribbon for the transmission of a plurality of optical signals.

A gearing system may be added to either the single or multi-channel limited rotation FORJ embodied in FIG. 1 so that the twisting of the optical fiber(s) (10) is not a one to one ratio with the relative rotation of the rotor (16) and/or stator (12). This would reduce the stress on the optical fiber(s) (10) per relative rotation of the rotor (16) and/or stator (12). In addition, A mechanical stop and/or a rotational counter may also be added to either the single or multi-channel limited rotation FORJ embodied in FIG. 1 to prevent the over rotation of the limited rotation FORJ and thereby preventing the damage that would be associated with that over rotation.

Figure 2:
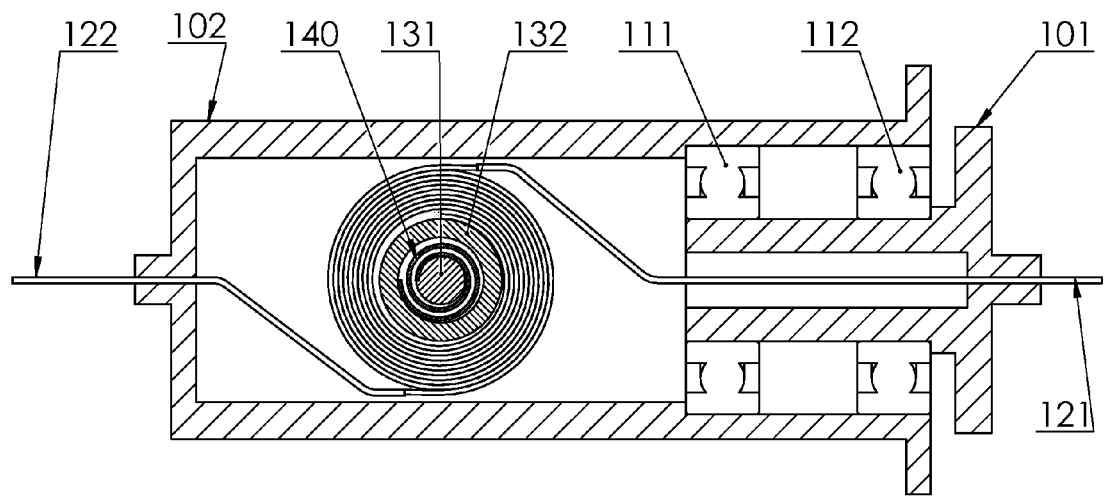
FIG. 2 illustrates another embodiment of a single channel limited rotation FORJ in the present invention.

FIG. 2 shows another possible embodiment of a single channel limited rotation FORJ comprising of an optical fiber with a rotor side (121) and a stator side (122), a rotor (101), a stator (102), a shaft (131), a fiber spool (132), a wound spring (140), and two bearings (111 and 112). As in the previous embodiment the rotor (101) and the stator (102) have a common axis of rotation about which they are relatively rotatable. Without loss of generality the bearings (111 and 112) are between the rotor (101) and stator (102) providing smooth and concentric rotation of the rotor (101) relative to the stator (102). This embodiment shows the shaft (131) attached to the stator (102). However, the shaft (131) could be attached to the rotor (101) or it could be free floating in either the stator (102) or the rotor (101).

The fiber spool (132) has optical fiber wound about it with one end of the optical fiber (122) mechanically attached to the stator (102) and the other end of the optical fiber (121) mechanically attached to the rotor (101). Further, the fiber spool (132) is rotatable relative to the shaft (131). The optical fiber is wound onto the fiber spool (132) in such a manner that optical fiber is released from both ends increasing the linear length of both stator side of the optical fiber (122) and the rotor side of the optical fiber (121) proportionally when the fiber spool (132) is rotated in one direction relative to the shaft (131). Conversely the when the fiber spool (132) is rotated in the opposite direction relative to the shaft (131) the optical fiber is wound on back onto said fiber spool (132) from both ends thereby reducing the linear length of both stator side of the optical fiber (122) and the rotor side of the optical fiber (121) proportionally.

Without loss of generality suppose it is the clockwise rotation of the fiber spool (132) relative to the shaft (131) which releases the optical fiber. Similarly suppose it is the counter-clockwise rotation of the fiber spool (132) relative to the shaft (131) which winds the optical fiber back onto the said fiber spool (132). A wound spring (140) with one end attached to the shaft (131) and one end attached to the fiber spool (132) shall, without loss of generality, be considered to be in its equilibrium state when the linear length of both the rotor side optical fiber (121) and stator side optical fiber (122) are minimized. As the rotor (101) is rotated relative to the stator (102) the stator side of the optical fiber (122) and/or the rotor side of the optical fiber (121) twists about itself. This twisting reduces the linear length of the fiber, which in turns creates a tangential on the fiber spool (132). This tangential force causes the fiber spool (132) to rotate releasing more optical fibers to both the rotor (101) and stator (102) sides. In addition to releasing more optical fiber, the rotation of the fiber spool (132) causes the wound spring (140) to move out of its equilibrium position storing potential energy. This potential energy in the imbalanced wound spring (140) is released when the rotor (101) is rotated in the opposite direction relative to the stator (102) causing the fiber spool (132) to rotate in the opposite direction relative to the shaft (131), back towards the wound spring's (140) equilibrium position, thereby winding the optical fiber back onto said fiber spool (132).

The single channel limited rotation FORJ embodiment of FIG. 2 may be made into a multiple channel limited rotation FORJ simply by adding the plurality of optical fibers or an optical fiber ribbon for the transmission of a plurality of optical signals.

A gearing system may be added to either the single or multi-channel limited rotation FORJ embodied in FIG. 2 so that the twisting of the optical fiber(s) is not a one to one ratio with the relative rotation of the rotor (101) and/or stator (101). This would reduce the stress on the optical fiber(s) per relative rotation of the rotor (101) and/or stator (102). In addition, A mechanical stop and/or a rotational counter may also be added to either the single or multi-channel limited rotation FORJ embodied in FIG. 2 to prevent the over rotation of the limited rotation FORJ and thereby preventing the damage that would be associated with that over rotation.

Figure 3:
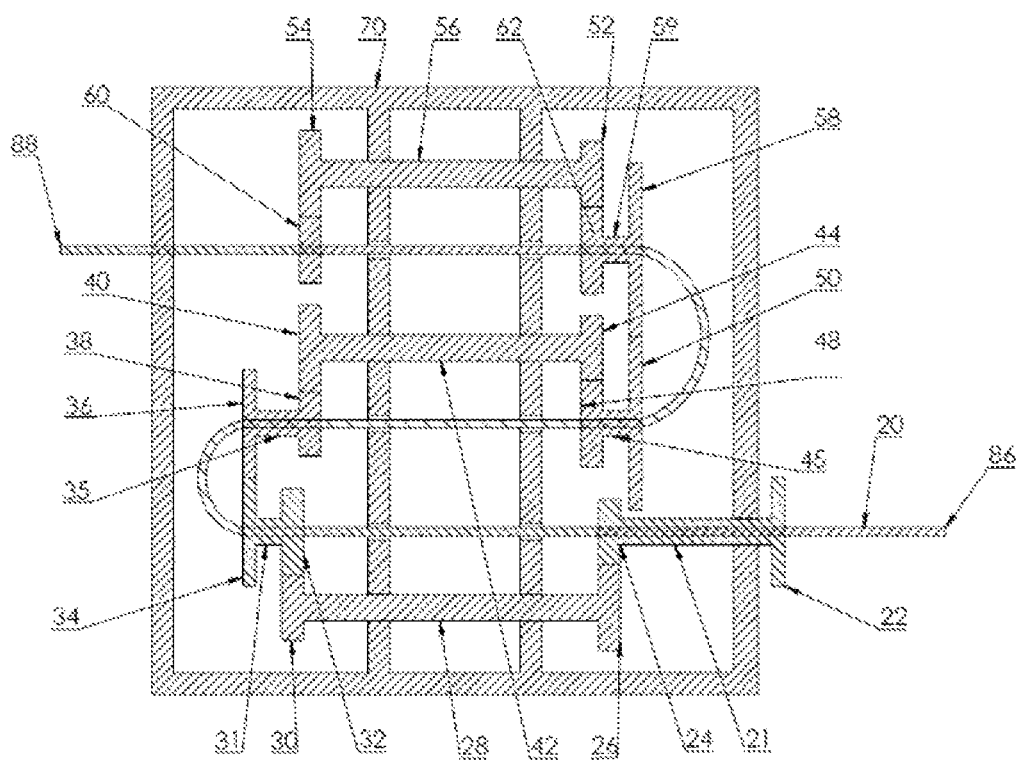
FIG. 3 shows a multi-stage limited rotation FORJ embodiment with gear mechanism in the present invention.

Two or more stage of the single channel limited rotation FORJ similar to the embodiment in FIG. 1 can be interconnected using a gearing system to evenly distribute the torsional force between stages along the optical fiber(s) as well as increase the total number of rotations possible. FIG. 3 shows a possible embodiment of a multi-stage single channel limited rotation FORJ mentioned in the preceding sentence. It consists of an optical fiber (20) with a rotor side (86) and a stator side (88), a rotor (22), a stator (70), a plurality of gears (24, 26, 30, 32, 34, 36, 40, 44, 48, 50, 52, 54, 58 and 62) and a plurality of shafts (21, 28, 31, 35, 42, 45, 56 and 59). The optical fiber (20) is mechanically attached to the rotor (22), the stator (70), gear number 60 and each of the shafts through which is passes (21, 31, 35, 45 and 59). Further all of the gears (24, 26, 30, 32, 34, 36, 40, 44, 48, 50, 52, 54, 58 and 62) and all of the shafts (21, 28, 31, 35, 42, 45, 56 and 59) are rotatable relative to the stator (70) and the rotor (22).

Each gear is driven by the gear adjacent to it (26, 32, 36, 40, 48, 52, 58 and 60) or by a shaft (24, 30, 34, 38, 44, 50, 54, and 62). Each pair of gears which are connected by a shaft (26-30, 32-34. 36-38, 40-44, 48-50, 52-54 and 58-62) rotate at the same rate. In other words gear number 26 rotates at the same rate as gear number 30; gear number 32 rotates at the same rate as gear number 34 and so on. However, each gear shaft pair does not necessarily rotate at the same rate. For example, gear-shaft pair 22-21-24 would not rotate at the same rate a gear shaft pair 32-30-34; for if it did there would be no relative rotation of the optical fiber (20) between shaft number 21 and shaft number 31. This would result in an uneven transfer of the torsional force through the optical fiber (20). To ensure an even distribution of the torsional force each gear-shaft pair through which the optical fiber (20) passes would have to step down the rate of rotation until it reached zero at the point the optical fiber (20) is mechanically attached to the stator (70).

For example, suppose without loss of generality that the rotor (22) is rotating at 400 RPM then the gear (24) and shaft (21) would also be rotating at 400 RPM; however, by carefully selecting the relative size of gear numbers 24, 26, 30 and 32 the rotational rate of gear shaft pair 32-31-34 could be stepped down to 300 RPM, which would be a relative rotational rate of 100 RPM between gear shaft pair 22-31-24 and gear shaft pair 32-31-34. Suppose then, without loss of generality that gear shaft pair 32-31-34 rotates at the same rate as gear shaft pair 38-35-36 and that gear shaft pair 48-35-50 rotates at the same rate as gear shaft pair 62-59-58. Then using a similar gear ratio as previously described the rotational rate of gear shaft pair 48-45-50 could be stepped down to 200 RPM and the rotational rate of gear number 60 could be stepped down to 100 RPM. This would mean the relative rate of rotation between gear shaft pair 22-31-24 and gear shaft pair 32-31-34 is the same as the relative rate of rotation between gear shaft pair 38-35-36 and gear shaft pair 48-45-50, which is the same as the relative rate of rotation between gear shaft pair 62-59-58 and gear number 60 which is the same as the relative rate of rotation of gear number 60 to the stator. In each case the relative rate of rotation is 100 RPMs. Therefore, after the rotor is rotated for one minute at 400 RPM each section of the optical fiber (20) located between the aforementioned gear shafts pairs will be twisted 100 times.

Gears number 34 and 50 can be used strictly to transfer the rotational motion from one stage to the next, as in the above description, in which case they would have the same number of gear teeth as gear number 36 and 58 respectively. In this case there would be no twisting of the optical fiber (20) between two stages. However, if it is desirable to have twisting of the optical fiber (20) between two stages then gears number 34 and 36 as well as gears number 50 and 59 can be chosen such that there is the desired relative rotation is achieved in addition to the transfer of rotational motion from one stage to the next.

The single channel limited rotation FORJ embodiment of FIG. 3 may be made into a multiple channel limited rotation FORJ simply by adding the plurality of optical fibers or an optical fiber ribbon for the transmission of a plurality of optical signals. In addition, A mechanical stop and/or a rotational counter may also be added to either the single or multi-channel limited rotation FORJ embodied in FIG. 2 to prevent the over rotation of the limited rotation FORJ and thereby preventing the damage that would be associated with that over rotation.

We claim:

1. A single channel limited rotation rotary joint comprising:
    a rotor;
    a stator;
    one or more bearings;
    one or more optical fiber(s);
    a fiber spool;
    a shaft;
    and a wound spring; wherein said optical fiber(s) are mechanically attached to said rotor and said stator and said optical fiber(s) are attached to and wound around said fiber spool such that when said fiber spool is rotated in one direction said optical fiber(s) are released to said stator side, said rotor or both said stator and said rotor sides and when said fiber spool is rotated in the other direction said optical fiber(s) are re-wound onto said fiber spool from the location to which it was previously dispensed;
    wherein said fiber spool is mechanically attached to said wound spring which is also attached to said shaft and said shaft is either free floating within the rotary joint, mechanically attached to said stator or is mechanically attached to said rotor;
    wherein said rotor is rotated it twists said optical fiber(s) which creates tension applying a tangential force component onto said fiber spool causing said fiber spool to rotate relative to said shaft releasing more said optical fiber and the relative rotation of said fiber spool to said shaft moves said wound spring out of its equilibrium position balancing the tangential force applied onto said fiber spool by said twisted optical fiber; and rotating said rotor in the opposite direction untwists said optical fiber(s) reducing the tangential force on said fiber spool allowing said wound spring to move back towards its equilibrium position causing said fiber spool to rotate in the opposite direction relative to said shaft resulting in said optical fiber(s) being re-wound onto said fiber spool.

2. The limited rotation rotary joint of claim 1, further comprising a mechanical gearing system, wherein said gearing system reduces the number of times said optical fiber(s) are twisted with respect to the relative rotation of said rotor to said stator.

3. The limited rotation rotary joint of claim 1, further comprising a mechanical gearing system, wherein said gearing system rotates said fiber spool with respect to said shaft when said rotor is rotated with respect to said stator.

4. The limited rotation rotary joint of claim 1, further comprising a mechanical stopping mechanism, wherein said stopping mechanism prohibits the relative rotation of said rotor with respect to said stator after some fixed number of relative rotations in either direction.

5. The limited rotation rotary joint of claim 1, further comprising a counting mechanism that identifies the number of relative rotations between said rotor and said stator in either direction from a predetermined set point.

6. The limited rotation rotary joint of claim 1 further comprising:
   one or more seals; and
   an incompressible fluid; wherein the rotary joint is filled with said incompressible fluid and said seals are employed to prevent said incompressible fluid from leaking out of the rotary joint.

7. A limited rotation fiber optic rotary joint for optic signal transmissions comprising:
   a housing member;
   a rotor member being rotatable relative to said housing member;
   a continuous flexible fiber bundle having 2 end portions fixed to said housing member with one of said end portions and fixed to said rotor member with another end portion;
   a middle portion of said continuous fiber bundle having multiple segments and arranged inside said housing member; and
   means to allow evenly twist on each said segment of said middle portion of the continuous fiber bundle, wherein said fiber bundle is composed of one or more optical fibers;
   wherein said means to allow evenly twist on each said segment of said middle portion of the continuous fiber bundle further comprising a multiple gear mechanism dividing said middle portion of the continuous fiber bundle into multiple segments, in which each segment contains at least 2 central gears; one end portion of said each segment of said fiber bundle being fixed with one of said central gears and another end portion of said each segment of said fiber bundle being fixed with another said central gear; and at least other 2 extra gears engaged with said central gears to provide a speed reduction between said 2 central gears.

8. A limited rotation fiber optic rotary joint according to claim 7, wherein said multiple gear mechanism includes at least 2 optional gears to transmit rotation motion from upper level segment to lower level segment of said middle portion of said continuous fiber bundle except last lower level segment; and said gears being rotatable relative to said housing member; said first upper level segment being arranged to closed to said rotor member; while said last lower level segment being arranged to closed to said housing member.

* * * * *